Figure 1:
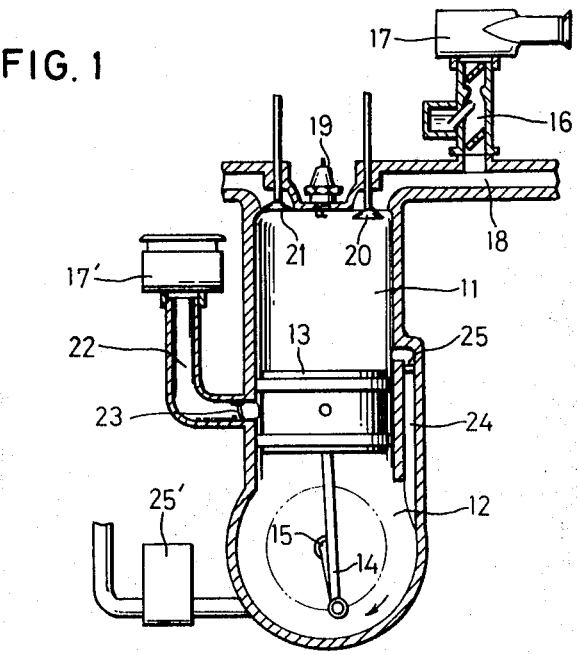

United States Patent

[11] 3,613,646

| [72] | Inventor | Souichi Hisada<br>460 11-2, 2-chome, Nishiki-cho, Naka-ku,<br>Nagoya, Japan |
|---|---|---|
| [21] | Appl. No. | 856,540 |
| [22] | Filed | Sept. 10, 1969 |
| [45] | Patented | Oct. 19, 1971 |

[54] SECONDARY AIR INJECTION SYSTEM FOR AN INTERNAL COMBUSTION ENGINE
1 Claim, 5 Drawing Figs.

[52] U.S. Cl. ................................................. 123/75 CC,
123/73, 123/75 RC
[51] Int. Cl. ............................................... F02b 75/02
[50] Field of Search ................................. 123/75 CC,
75 RC, 73 V

[56] References Cited
UNITED STATES PATENTS

| 1,460,831 | 7/1923 | Thompson | 123/73 V |
| 1,477,363 | 12/1923 | Kessler | 123/75 CC |
| 1,537,616 | 5/1925 | Mellen | 123/75 CC |

*Primary Examiner*—Wendell E. Burns
*Attorney*—Linton & Linton

ABSTRACT: A secondary air-injecting system for obtaining a large compression ratio with a small engine stroke and for burning fuel gas completely, in which air is injected in engine cylinders at least in portions of intake, detonation and exhaust periods of the engine operation cycle from a separate air tank and/or engine crankcases where air is compressed by the downward motion of engine pistons.

PATENTED OCT 19 1971 3,613,646

INVENTOR
SOUICHI HISADA

BY *Linton and Linton*
ATTORNEYS

INVENTOR
SOUICHI HISADA

SECONDARY AIR INJECTION SYSTEM FOR AN INTERNAL COMBUSTION ENGINE

The present invention relates to an internal-combustion engine and more particularly to a secondary air-injecting system in the engine for burning fuel gas completely and for reducing piston strokes.

The conventional internal-combustion engine requires a large piston stroke in order to obtain a desirable compression ratio (the ratio of exhaust volume and combustion chamber volume) because the inhalation is insufficient in the earlier portion of the intake period. However, the large piston stroke has clearly many harmful effects on the high-speed rotation of the internal-combustion engine. On the other hand, the atmospheric contamination condition attributed to the exhaust gas from internal-combustion engines, so-called smog, has become very harmful to sanitary conditions of cities as the number of automobiles has increased. As a method for elimination poisonous materials in exhaust gas, it has conventionally been adopted to reburn the unburned gas by introducing fresh secondary air into exhaust pipes. However, because the exhaust gas is at such a comparatively low temperature as 600°–80° C. When it encounters the fresh air and because the exhaust gas is not mixed with the secondary air on account of the high-speed laminar flow of the former, the reburning can not be carried out satisfactorily and gases of high-burning point such as $C_6H_{14}$ and C are exhausted still in an unburned state.

An object of the present invention is to provide a secondary air-injecting system for an internal-combustion engine in which fresh secondary air is injected into combustion chambers of the internal-combustion engine at least in portions of intake, detonation and exhaustion periods of the engine operation cycle.

Another object is to provide a secondary air-injecting system described above in which the secondary air for injection is pressurized by an air compressor separate from the engine cylinder or by the engine piston in the crankcase.

Still another object is to provide a secondary air-injecting system in which the secondary air is injected through a port bored through the engine cylinder wall or through openings which are opened simultaneously with the exhaust valve or the intake valve of the engine.

Figure 2:
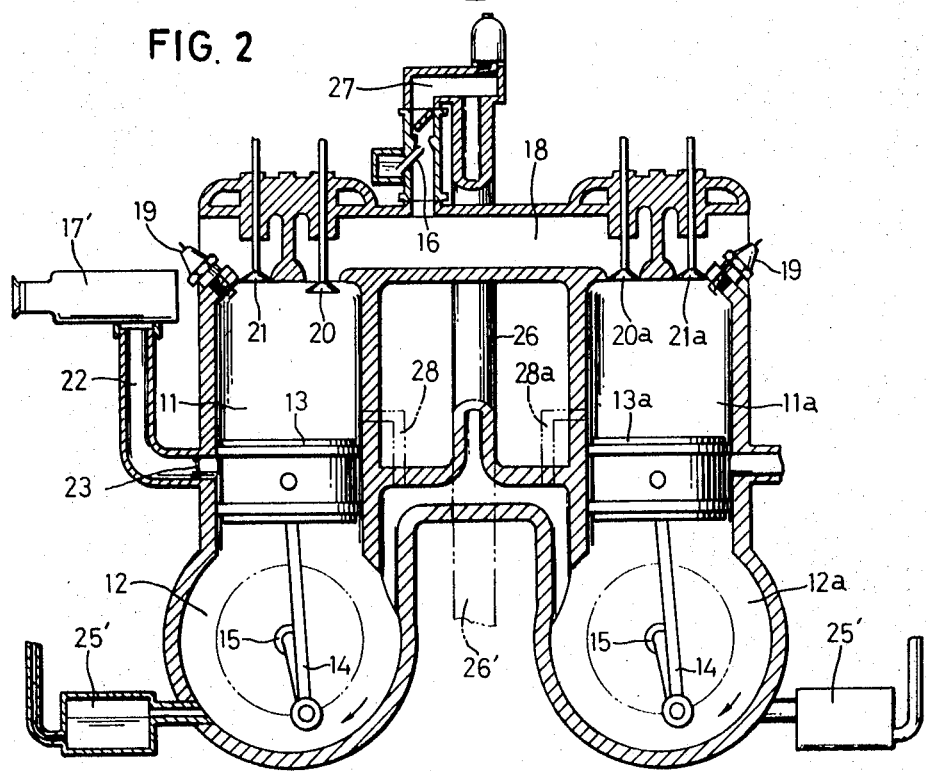
Figure 3:
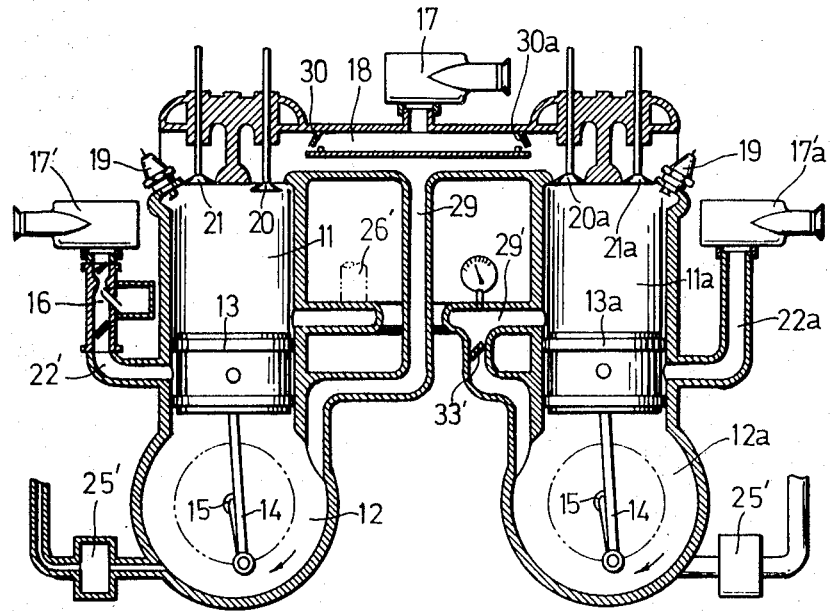
Figure 4:
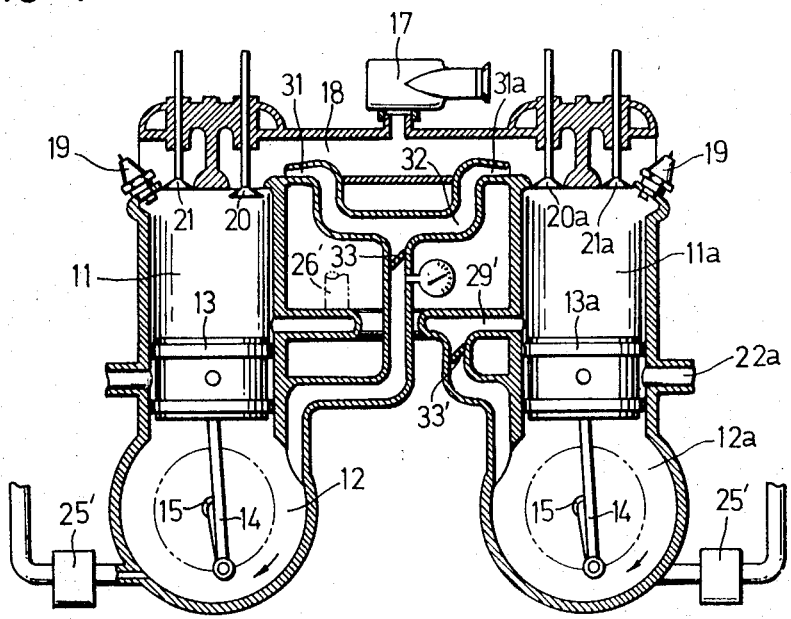
Figure 5:
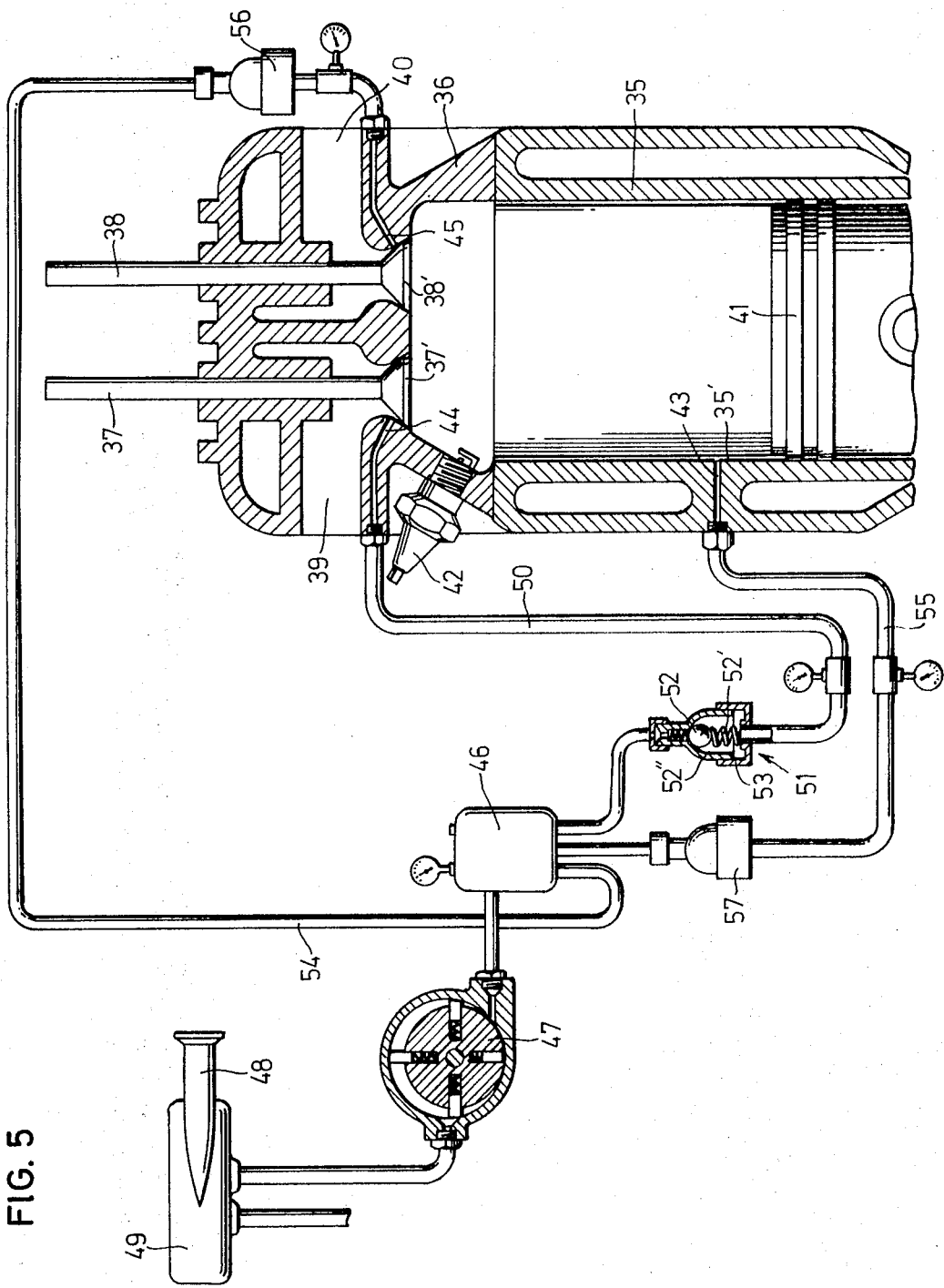

The other objects and features of the present invention will become apparent from the following detailed descriptions and claims taken in conjunction with appended drawings, in which:

FIG. 1 is a cross-sectional elevation view of an internal-combustion engine where the present invention is embodied, FIG. 2 is a cross-sectional elevation view similar to FIG. 1 but showing only two of engine cylinders of a multicylinder engine, FIG. 3 is a cross-sectional elevation view similar to FIG. 2 but showing another embodiment, FIG. 4 is a cross-sectional elevation view similar to FIG. 3 but showing an embodiment with some portions different from those in FIG. 3 and FIG. 5 is a view in partial cross section of still another embodiment.

Referring to FIG. 1, a cylinder 11 and a crankcase 12 are illustrated. A piston, a connecting rod and a crankshaft are represented 13, 14 and 15 respectively. A carburetor 16 is mounted between an air purifier 17 and an intake manifold 18. A spark plug, an intake valve and an exhaust valve are represented by 19, 20 and 21 respectively. The crankcase 12, which may be called a compression chamber, is formed integrally with the cylinder 11 and is sectionalized by the piston 13 in such a manner that air in said crankcase is compressed while the piston is moving towards the lower dead point. An air feeder 17' and a feeder pipe 22 communicating the feeder 17' with the crankcase 12 are for feeding air to the crankcase 12 through a check valve 23 which can be open only while pressure is lower in the crankcase than in the air feeder. An air conduit 24 interconnecting the crankcase 12 and the cylinder 11 is for injecting the pressurized secondary air into the cylinder 11 through a check valve 25 which can be open while pressure is lower in the cylinder than in the crankcase. The air conduit 24 may be cooled, for example, by spiraling a water pipe around it. An oil tank 25' is for lubrication of the crankcase and can contribute in some degree to cooling air there.

As for the system described above the operation is as follows. Some quantity of compressed air is produced in the crankcase 12 whenever the piston moves downward i.e. toward the lower dead point. Namely when the piston 13 moves upwards i.e. toward the upper dead point, the air in the crankcase is expanded and some volume of air is introduced into the crankcase 12 from the air feeder 17' and when the piston moves downward, the pressure in the crankcase rises enough to send the pressurized air to the cylinder 11 through the air conduit 24 in the later portion of the expansion stroke of the piston. Consequently in the cylinder, the introduction of the secondary air occurs in the detonation period as the result of the air sent from the crankcase at every approach of the piston toward the lower dead point and the burning of the fuel-air mixture in the cylinder is promoted. Also the cylinder 11 can contain a plentiful amount of air in the intake period of the engine cycle despite of its small volume as the result of the pressurized air introduced there and a large compression ratio results equivalently. The fuel-air mixture can be rendered proper by determining the fuel-air mixing ratio of the mixture charge from the intake valve 20 in consideration of the amount of air to be injected from the crankcase. A similar effect may be obtained by sending air directly to the cylinder 11 or the crankcase 12 by means of, for example, a blower.

In the description referring to FIG. 2, those constructional components which can be regarded as identical with those already described in the previous figure and are well known in the conventional art are given same references as those used in the previous figure to avoid the repetition of descriptions. If necessary, a letter $a$ is attached to reference numerals in order to distinguish members associated with the right cylinder. In FIG. 2, which shows an embodiment adapted to a four-cylinder engine two of whose pistons move in phase, an air conduit 26 is communicated with both crankcases 12 and 12a and is led to an air manifold 18 through an air passage 27 and a carburetor 16. An air pipe 26' which may be connected to a blower, is for injecting air directly into cylinders from the blower. The operation of the system described above is as follows. While the pistons 13 and 13a are moving towards the lower dead point, the air in crankcase 12 and 12a is compressed and led to the manifold 18 through the carburetor. As one cylinder 11a is ordinarily in the detonation period if the other cylinder 11 is in the intake period, one intake valve 20 is open and the other 20a is closed, the pressurized air being injected only into the cylinder 11. Thus plenty of air pressurized in both crankcases can be injected into one cylinder. After one reciprocation of pistons 13 and 13a, the operation of the piston 13 interchanges with that of piston 13a i.e. the cylinder 11a is in the intake period and the cylinder 11 is in the detonation period, the pressurized air entering the cylinder 11a through the valve 20a. Air pipes 28 and 28a may be provided to communicate crankcases with cylinders through lower portion of the cylinder walls so that the pressurized air may be injected into cylinders at every downward motion of pistons. It is also possible to introduce fuel-air mixture to crankcases 12 and 12a from the carburetor 16 and to feed the mixture gas compressed there directly to a manifold 18.

Referring to FIG. 3, those constructional components which can be regarded as identical with those in FIGS. 1 and 2 are given same references to avoid repeated descriptions. A fuel-air mixture conduit 29 is for communicating one crankcase 12 with a manifold 18 and a bifurcated air conduit 29' is for communicating the other crankcase 12a and cylinders 11 and 11a through lower portions of cylinder walls. An intake pipe 22' connects one crankcase 12 and an air purifier 17' through a carburetor 16. Check valve 30 and 30a are provided in the manifold 18 in order to introduce air into one cylinder 11 or the other 11a through one intake valve 20 or the other 20a from an air purifier 17 when pressure is lower in the cylinder 11 or 11a than in the air purifier and in order to stop said airflow when the pressure in the crankcase 12 or 12a rises sufficiently. The operation of the system described above is as follows. When one piston 13 moves downwards in the intake period, the fuel-air mixture fed through the intake pipe 22' is compressed in the crankcase 12 and injected through the fuel-air mixture conduit 29 into the cylinder 11 but not into the cylinder 11a which is now in the detonation period. At the same time air from an air feeder 17'a is compressed in the crankcase 12a by the piston 13a and injected into both cylinders 11 and 11a through the bifurcated air conduit 29'. Referring to FIG. 4, references are given in the same manner as in FIGS. 2 and 3. In this figure, a pair of jet nozzles 31 and 31a attached to the bifurcated ends of a mixture conduit 32 which communicates with the mixture compression crankcase 12 are for jetting the compressed fuel-air mixture. Regulator valves 33 and 33' operating in cooperation with an engine accelerator are formed in the conduits 32 and 29'.

As seen from above descriptions, compressed air can be produced by every downward movement of pistons and in addition the nearer pistons approach the lower dead point, the higher the pressure in the crankcases is thus facilitating air injection into the engine cylinder in the later portion of the intake period of the engine operation cycle. Therefore, even if the piston stroke is small, a high compression ratio can be obtained, resulting in favorable conditions for the high-speed rotation of the engine. On the other hand, the air injected in the later portion of the detonation period contributes to the complete burning of the fuel-air mixture gas to eliminate poisonous components in the exhaust gas.

Referring to FIG. 5, an engine cylinder portion is composed of a cylinder 35 and a cylinder head 36. An intake valve 37 and a exhaust valve 38 are provided so as to contact closely with valve seats 37' and 38' formed in the cylinder head respectively and are operable in conjunction with the rotation of the internal combustion engine. An intake port 39 and an exhaust port 40 communicate with intake and exhaust manifolds respectively. A piston and a spark plug are represented by 41 and 42 respectively. An air injection port 43 is bored through the lower portion of the cylinder wall 35' with which the piston contacts intermittently according to the engine operation. Air injection openings 44 and 45 are bored through those portions of the cylinder head with which the intake or exhaust valve contacts intermittently according to the engine operation and can, therefore, open simultaneously with valves 37 and 38 respectively. An air tank 46 for reserving compressed air is communicated with a compressor 47 separate from the cylinder. The compressor 47 is in turn, communicated with an air intake 48 through an air filter 49. The air injection opening 44 and the air tank 46 is connected by an air pipe 50 through a check valve 51 including a ball 52, a compression spring 52' pushing the ball 52 so as to close air passage, a cone 52'' receiving the ball and an adjustable cap 53. This check valve can open when pressure is higher in the air tank than in the cylinder by a difference which is adjusted by the cap. Air pipes 54 and 55 communicate the air tank 46 with the opening 45 and port 43 respectively and check valves 56 and 57 formed in air pipes 54 and 55 are of same construction and function as the check valve 51. The operation of the system described above is as follows. When the piston 41 moves towards the lower dead point in the intake period, the intake valve 37 and the injection opening 44 open simultaneously and air is introduced from the tank 46 through the pipe 50 and the check valve 51, thereby raising the compression ratio. When the piston moves upwards in the exhaust period, the exhaust valve 38 and the opening 45 open simultaneously and air is introduced from the tank 46 through the pipe 54 and the valve 56, thereby promoting burning of unburned mixture gas. In addition, air is injected into the cylinder from the port 42, whenever the piston 41 is situated below the port 43 whether in the detonation period or in the intake period. The opening 45 may be opened to the atmosphere instead of communicating with the pipe 54 through the valve 56. Then air is inhaled from the atmosphere in the exhaust period due to the reduction of the static pressure in the cylinder resulting from the exhaust gas flow.

The present invention has been described with preferred embodiments but it should be understood that many changes and modifications are possible without departing from the spirit of the invention and the scope of following claims.

What I claim is:

1. In an internal-combustion engine having at least one cylinder, an intake valve, an exhaust valve and an ignition plug in the head of said cylinder, a piston slideable in said cylinder, a connecting rod connected to said piston, a crankshaft connected to said connecting rod and a crankcase for said crankshaft, a secondary air-injecting system comprising an air-port through the sidewall of said cylinder positioned for being closed by said piston when said piston is at its lowest dead center position and opened to said crankcase when said piston is positioned above said port, an air conduit in said cylinder opening in said crankcase and in said cylinder at a position in said cylinder above the top of said piston when said piston is at its lowest dead center position and below said piston when said piston is at its top dead center position, said port and air conduit being the only openings in the sidewall of said cylinder below the top dead center of said piston, a check valve in said port which can open only towards the interior of said cylinder and a check valve in said air conduit which can open only towards the interior of said cylinder whereby air can automatically flow only through said port into said crankcase when said piston is above said port and from said crankcase through said air conduit into said cylinder when said piston is at its lower dead center.